Feb. 19, 1924.   1,483,913

M. SCHWARTZ

AUTO BUMPER

Filed Aug. 23, 1923

INVENTOR
Max Schwartz
BY C. P. Goepel
his ATTORNEY

Patented Feb. 19, 1924.

1,483,913

UNITED STATES PATENT OFFICE.

MAX SCHWARTZ, OF NEW YORK, N. Y.

AUTO BUMPER.

Application filed August 23, 1923. Serial No. 658,852.

*To all whom it may concern:*

Be it known that I, MAX SCHWARTZ, a citizen of the United States, and resident of the borough of Bronx, in the county of Bronx and State of New York, have invented new and useful Improvements in Auto Bumpers, of which the following is a specification.

This invention relates to bumpers designed to be attached to automobiles, and has for its main object to provide a bumper of the character stated that is strong in construction, so as to be adapted to withstand shocks and impacts incident to its use, and which may be constructed of few parts, not liable to become out of working order, and adapted to have quick, direct, and positive action when in use.

With the following and other objects in view, hereinafter stated, the invention consists of the novel construction, combination, and arrangement of parts hereinafter more specifically stated, and illustrated in the accompanying drawings, wherein is shown a device embodying the structure of the invention in its preferred form, but it is to be understood that changes, variations, and modifications may be resorted to without departing from the scope of the invention.

Figure 1:
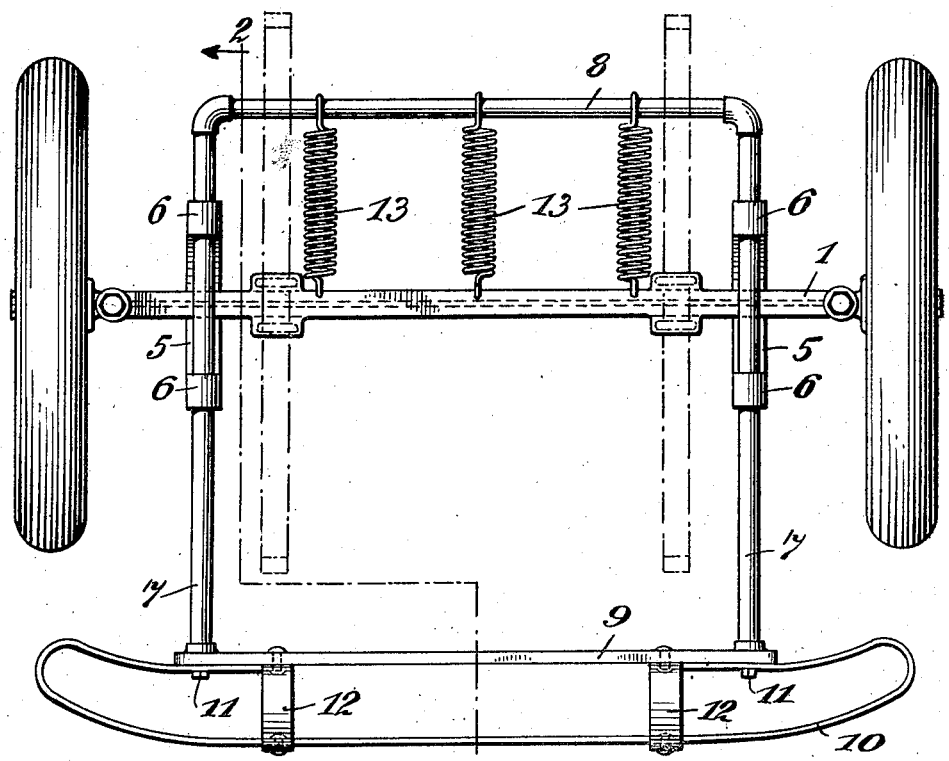
Figure 2:
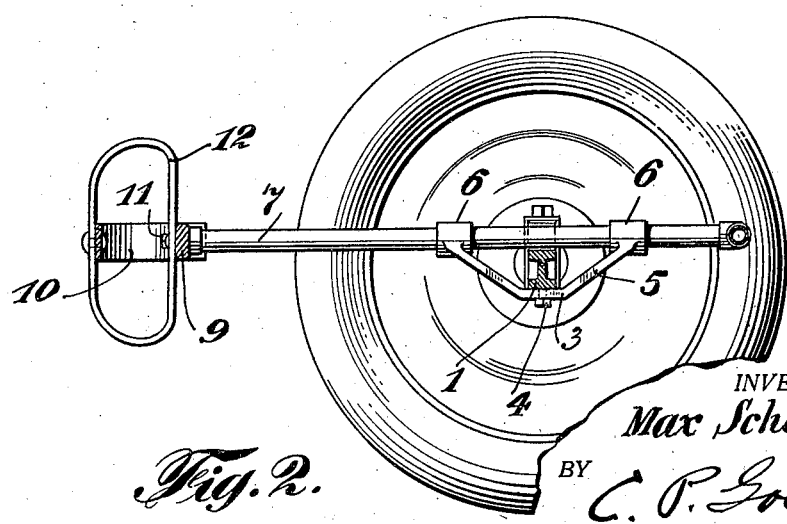

In describing the invention in detail, reference is had to the accompanying drawings, which form a part of this specification, and in which like numerals of reference indicate corresponding parts throughout the several views, and wherein:

Fig. 1 is a plan view of a device embodying the invention, mounted upon the axle of an automobile; and Fig. 2 is a side elevation, partly in section and partly broken away, taken on the line 2—2 of Fig. 1.

As illustrated in the drawings, 1 represents the front axle of an automobile of any suitable construction, mounted upon the usual carrying wheels. A frame supporting bracket has its central portion 3 secured to the axle, preferably the underside thereof, by means of bolts 4 or otherwise. Arms 5 extend outward and upward from the cental portion of the bracket and are provided on their ends with sleeves 6, the inner surfaces of which form bearings for longitudinally movable side bars 7 forming part of the bumper frame.

The side bars of the bumper frame are connected together at their rear end by means of a cross bar 8, and at their forward end by a cross bar 9, preferably flattened in cross section. A bumper frame or head 10 is secured to the front cross bar of the frame in any suitable manner, such as by means of bolts 11 which connect the inturned ends of the bumper head with the side bars 7. Yokes 12, extending in a plane at right angles to that of the bumper frame may, if desired, be connected with the front and back portion of the bumper head.

Springs 13 are connected at one end with the axle, and at their other end with the rear cross bar 8 of the bumper frame. These springs normally hold the bumper in a projected position.

When the front bar 10, or head of the bumper, strikes a person or obstacle in the path of travel of the machine, the bumper frame, comprising the side bars 7, rear bar 8, and front bar 9, is moved backwardly through the sleeves 6, thereby expanding the springs and cushioning the impact exerted on the bumper.

Upon the release of the pressure against the front bar or frame of the bumper, the springs 13 retract and return the frame of the bumper to its normal position relative to the axle 1.

From the foregoing description considered in connection with the accompanying drawings, the construction, mode of operation, manner of use, and the several advantages of the present invention will be clearly and fully understood.

It will be seen that by mounting the bumper frame on the bracket constructed as shown and described, the side bars of the frame are each supported on two bearings sufficiently spaced from each other to insure a firm hold upon the frame, thereby preventing the frame at its forward part from being raised above or depressed below the horizontal plane of the axle.

The spaced sleeves of the bracket and the ample bearings of said sleeves also prevent any lateral or tortional movement of the bumper frame.

The sleeves of the bracket, moreover, may be of any desired length, so as to provide an extensive bearing for the bumper frame. By means of such construction the thrust exerted on the frame, when the bumper meets with an obstacle in its path, is taken up and sustained by the axle of the automobile, thereby relieving all of the parts of the machine from any strain or stresses resulting from the action of the bumper.

It will be also seen that because of the few parts necessary to form the device, such parts may be made at a minimum cost, and strong enough to withstand any strains to which the bumper may be subjected.

Instead of providing the bumper frame with a rear cross bar, the side bars of the frame may be each provided with a cross head or bar and tension springs may be connected with said cross head and with arms or studs connected with the bearing sleeve, so that when pressure is applied to the head of the bumper a backward movement of the side bars will expand said springs, and the removal of said pressure will cause the springs to contract and press the side bars and buffer head forward to its initial position.

What I claim as new and desire to secure by Letters Patent is:

1. An auto bumper, in combination with an axle, a bracket mounted upon said axle and provided with inclined arms having bearing sleeves at the outer ends thereof, a frame having side bars slidingly mounted in said sleeves, a rear cross bar, a bumper head connected with the forward end of said frame, and springs connected with the rear cross bar of said frame and said axle.

2. An auto bumper, in combination with an axle, a bracket secured to the underside of said axle and provided with upwardly inclined arms having bearing sleeves connected with the outer end of said arms, a frame comprising side bars slidingly mounted in said sleeves, a front cross bar, a bumper head mounted upon said cross bar, a rear cross bar, and springs connecting said rear cross bar and axle to normally hold said bumper head in projected position.

3. In an auto bumper, the combination with an axle, a bracket secured to said axle, and provided with inclined arms having sleeves formed therewith, a bumper frame comprising side bars slidingly mounted in said sleeves above said axle, a rear cross bar, a front cross bar, a bumper head secured to the front cross bar, and springs connecting said axle with said rear cross bar, and adapted to normally hold said bumper head in projected position.

4. An auto bumper, in combination with an axle, a bracket secured to the lower portion of said axle, and provided with sleeves spaced on opposite sides of said axle, and having their axial line extending above the horizontal plane of said axle, a frame having side bars slidingly mounted in said sleeves, a front cross bar, and a rear cross bar connecting the sides of said frame, and springs connecting said axle and said rear cross bar, and adapted to normally hold said bumper head in projected position.

5. An auto bumper in combination with an axle, a bracket mounted upon said axle and provided with bearing sleeves, a frame having side bars slidingly mounted in said sleeves and provided with a cross bar, and tension springs connecting the ends of said cross bar with said bracket.

In testimony that I claim the foregoing as my invention, I have signed my name, hereunder.

MAX SCHWARTZ.